R. BOEKLEN.

Apparatus for Emptying Water-Closets, &c.

No. 6,584. Reissued Aug. 10, 1875.

*Witnesses.*
C. H. Watson
W. B. Hyperman.

*Inventor.*
Reinhold Boeklen

N. PETERS, PHOTO-LITHOGRAPHER, WASHINGTON, D. C.

UNITED STATES PATENT OFFICE.

REINHOLD BOEKLEN, OF BROOKLYN, NEW YORK.

IMPROVEMENT IN APPARATUS FOR EMPTYING WATER-CLOSETS, &c.

Specification forming part of Letters Patent No. 142,200, dated August 26, 1873; reissue No. 6,584, dated August 10, 1875; application filed July 27, 1875.

*To all whom it may concern:*

Be it known that I, REINHOLD BOEKLEN, of the city of Brooklyn, in the county of Kings and State of New York, have invented certain new and useful Improvements in Apparatus for Emptying and Removing Mud and Soil from Water-Closets and other places; and I do hereby declare that the following is a full, clear, and exact description thereof, that will enable others skilled in the art to which it appertains to make and use the same, reference being had to the accompanying drawings, and to the letters of reference marked thereon, which form a part of this specification.

My invention relates to an apparatus for removing mud and soil having more or less fluid matter mixed with it; and it consists in the combination of a portable steam-boiler, a soil-receiving tank, and a hose from said tank into the soil or mud to be removed, so arranged that by the admission of steam from the boiler into both the tank and the hose or pipe all the air therein is expelled, and, when the steam is condensed, a nearly-perfect vacuum is produced in both the tank and the hose, whereby the more or less dense and fluid matters are removed at the same time. It also consists in the combination, with the above, of a water-supply; and in the combination of parts, as will be hereafter more fully set forth.

Figure 1:
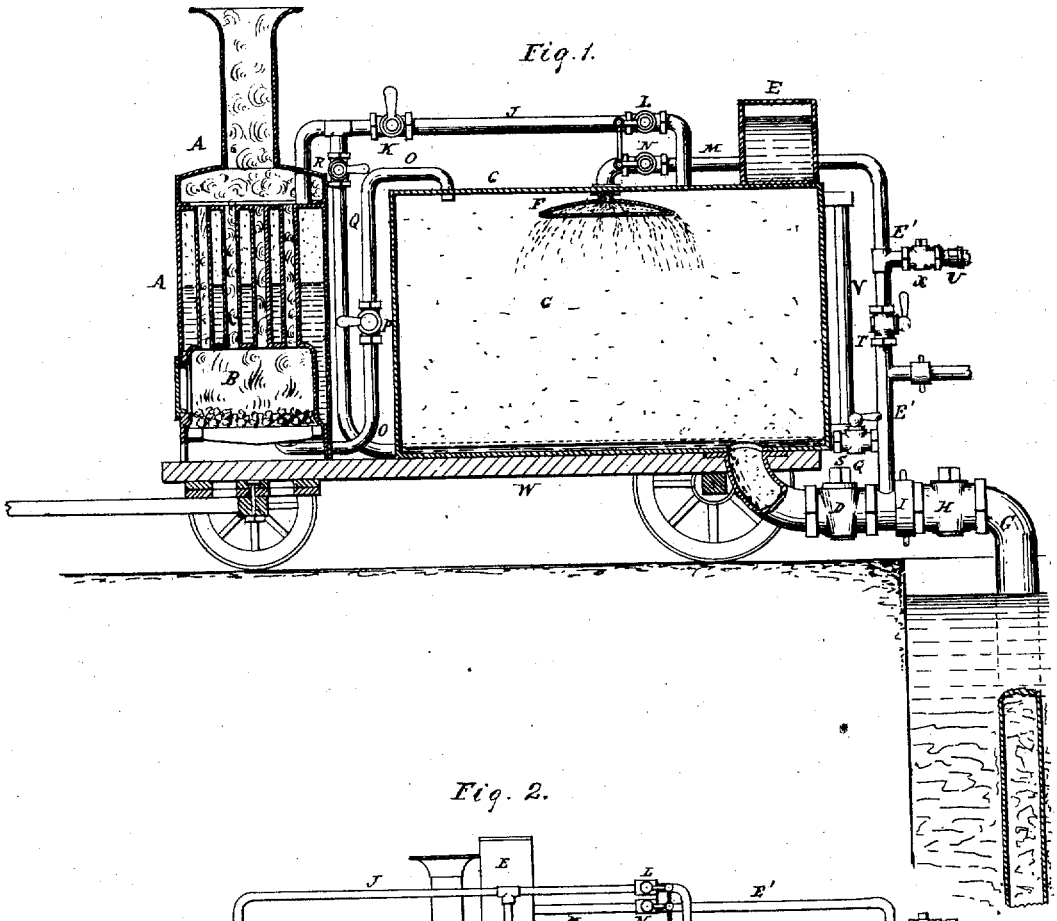
Figure 2:
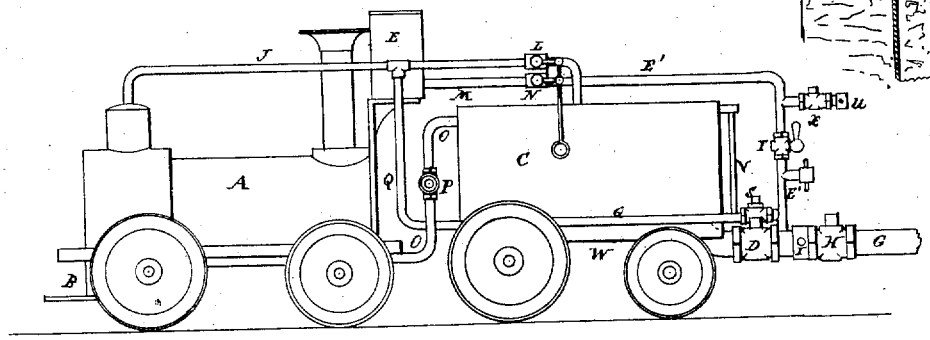

In the annexed drawing, Figure 1 is a longitudinal vertical section of my invention. Fig. 2 is a side elevation of the same, showing a modification when used for emptying large places.

A represents a steam-boiler, and B its furnace. C is an air-tight vessel of any suitable capacity, and suitably constructed for a vacuum-chamber. Its rear end or bottom has an elbow and stop-cock, D, with an end suitable for attaching a hose-coupling. Both the boiler and vacuum vessel or chamber may be mounted on the same wagon when used to empty small places. When used for removing large quantities, or for large places, each should preferably be mounted on a separate truck. E represents a water-supply reservoir or pipe, and F a sprinkler attached on the inside of the vessel C. G is a hose furnished with a stop-cock, H, and a coupling, I, on its end, suitable for attaching the same to the elbow and stop-cock D. Between the boiler and vessel is a pipe, J, provided with stop-cocks K and L, for conducting and stopping the flow of steam from the boiler to the said vessel. Between the water supply or reservoir E and sprinkler F is a pipe, M, with a stop-cock, N, to cause the flow of water, or stop the same, into the vessel C. O represents a pipe with a stop-cock, P, to connect and disconnect the flow of air from the vessel C with the furnace B of the boiler. The pipe J has a branch pipe, Q, leading the steam to the outlet of the cock D, and to the hose-pipe G, and it is provided with stop-cocks R and S; and, by means of the pipe E′, leading also into the pipe Q near its end entering the cock D, the water may be conducted into the hose G; and, by means of the stop-cock T on the pipe E′, the water is stopped from the hose. U represents a coupling for attaching the water-hose to supply the pipes E′ and M. The vessel C is furnished with a vertical glass gage, V, for observing the filling of the vessel. Between the pipe E′ and the coupling U is a stop-cock, X. W represents the truck on which the boiler A and vessel C are mounted.

When the apparatus is used it is located as near as practicable to the place to be emptied. The hose G is then attached by means of the coupling I. The boiler A may have been filled beforehand, so that it may have ready steam, and the cocks R, K, and P have been closed, to stop the communication with the vessel from the boiler. The cocks N, T, and X have also been stopped, to disconnect the water-supply. When the steam is ready the cocks D and H are opened, and the loose end of the hose is placed nearly upon the bottom of the place to be emptied. The cock S is closed, and the cock P is opened. The cocks R and K, and finally L, are opened. By this means the steam passes from the boiler to the vessel C, and from the vessel into the hose G, forcing out the foul air through the pipe O into the furnace. After the foul air has escaped the cock P is stopped, and the cock X is opened to supply the pipe E′ with water. Now, the cock L is closed, and, simultaneously with it, is the cock N moved and opened, there being a link, M′, between them. By this means a shower of cold water spreads from the sprinkler F into the vessel C, and thereby causing the steam therein and in the hose G to condense, and causing thereby vacuum and suction through the hose, and the filling of the vessel from the place to be emptied. As soon as the operator observes, through the gage V, that the vessel C is filled, or that the suction has ceased, the cock D is closed and the cock S opened to force back the contents of the hose, and the cock T is finally opened, and the cock S closed again, so that the last of the contents of said hose are forced out by the cold water, and that the hose is cleaned, after which the cocks T and H are closed, and the hose is uncoupled and removed. The apparatus is then brought to the place for discharging its contents, and, according to the contents the air-cock P is opened to admit air, or the steam-cock L may be opened to encourage the discharge, and the water-supply may be opened to clean out the vessel and hose. The apparatus can be brought back, and the operation of emptying renewed, until the place is empty.

When the apparatus is used for emptying large places it is better to have the boiler on a separate truck, and a number of trucks with vessels C, and the pipes between the boiler and vessel made to uncouple, so that the boiler may operate on one vessel while another is being emptied.

Having thus fully described my invention, what I claim as new, and desire to secure by Letters Patent, is—

1. The method of removing night-soil, sewage, or the like material from its receptacle, which consists in filling with steam both an air-tight tank and an air-tight conduit from the tank into the material to be removed, and, by injected water, condensing the steam in the tank and in the conduit down to the material, in order to obtain a simultaneous vacuum, through the tank and the conduit, above the material, for the purpose set forth.

2. The combination of the tank C and hose G with the water-supply M and stop-cock N, whereby a rapid and powerful vacuum is produced in both the tank and the hose, substantially as and for the purpose herein described.

3. The combination of the tank C, sprinkler F, with the pipe M, the hose G, and water-supply E′, and the stop-valve D, the boiler A, and steam-pipe J, and cock K, for charging the tank, and, after being charged, for cleaning the hose G, substantially as and for the purpose herein mentioned.

4. The combination of the boiler A with the pipe J and the tank C and hose G and pipe M, and with the pipe O with cock P, and the cock D and pipes E and M, and the pipe Q with the cocks R and H and N, for displacing the air in said tank and hose, and forcing it in the furnace of said boiler, and for charging said tank and cleaning said hose, substantially as herein set forth.

In testimony that I claim the foregoing I have hereunto set my hand this 26th day of July, 1875.

REINHOLD BOEKLEN.

Witnesses:
WM. B. UPPERMAN,
CHAS. P. WEBSTER.